United States Patent [19]

Nitschke

[11] Patent Number: 4,886,540

[45] Date of Patent: Dec. 12, 1989

[54] BLOW BACK CONTROL DEVICE FOR A GLASS SHEET TEMPERING SYSTEM

[75] Inventor: David B. Nitschke, Perrysburg, Ohio

[73] Assignee: Glasstech International L.P., Scarsdale, N.Y.

[21] Appl. No.: 223,913

[22] Filed: Jul. 25, 1988

[51] Int. Cl.$^4$ .................................................. C03B 27/04
[52] U.S. Cl. .......................................... 65/351; 65/104; 65/114; 65/349; 65/350
[58] Field of Search .................. 65/104, 114, 161, 349, 65/350, 351

[56] References Cited

U.S. PATENT DOCUMENTS

| | | | |
|---|---|---|---|
| 3,600,151 | 8/1971 | Cypher et al. | 65/104 X |
| 3,672,861 | 6/1972 | Ritter, Jr. et al. | 65/350 |
| 3,806,331 | 4/1974 | Bezombes | 65/351 |
| 4,447,252 | 5/1984 | DiNocco et al. | 65/104 X |

Primary Examiner—Arthur Kellogg
Attorney, Agent, or Firm—Brooks & Kushman

[57] ABSTRACT

A blow back control device (10) for use in a glass tempering system (12) is disclosed as including an air supply member (28) mounted between a glass heating furnace (14) and a quenching station (24). The air supply member (28) supplies a planar jet of high pressure blow back control air generally in a direction of glass sheet conveyance (A) away from an exit opening (20) of the furnace (14) and toward the quenching station (24) at an angle in the range of between 0° and 25° formed between the planar jet of high pressure air and a plane of conveyance of a glass sheet (16) along a conveyor (22) to deflect cooling air, supplied by blastheads (26,26') from entering the furnace (14).

13 Claims, 2 Drawing Sheets

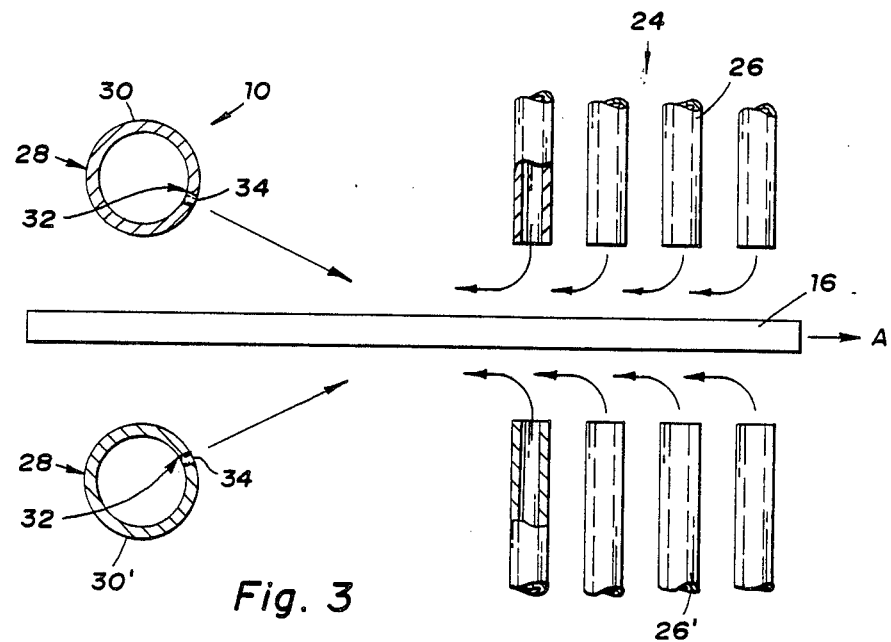
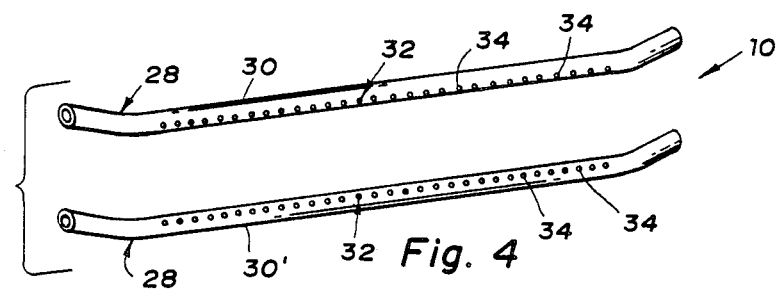
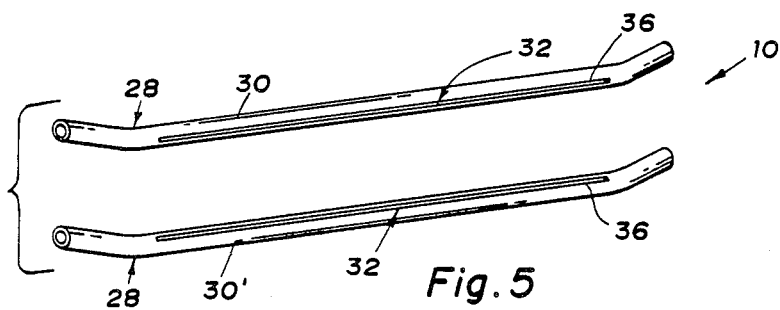

BLOW BACK CONTROL DEVICE FOR A GLASS SHEET TEMPERING SYSTEM

TECHNICAL FIELD

This invention relates to a blow back control device which has particular utility for use in a glass sheet tempering system in connection with the tempering of heated glass sheets.

BACKGROUND ART

A sheet of glass can be tempered to both increase its mechanical strength and improve its breakage characteristics. When tempered glass is broken, it collapses into a large number of relatively small, dull pieces instead of shattering into sharp pieces as in the case of annealed glass.

In a glass tempering system, the glass tempering process generally involves two steps. First, a sheet of glass is heated in a glass heating furnace to its deformation point of about 1200° F. to 1300° F. Secondly, the heated glass sheet is removed from the furnace and rapidly quenched by the application of cooling gas directed onto the hot glass sheet. Rapid cooling sets up high compressive forces near the surfaces of the glass sheet which give it desired strength and breakage characteristics.

The quenching operation takes place on a quench ring or roller conveyor, depending upon whether a side exit or end exit glass heating furnace is utilized, immediately after the glass has left the furnace. Thin glass sheets require more rapid application of cooling gas after exiting the furnace than does a thicker glass sheet. The close proximity of the furnace and quenching station combined with the heating step being followed directly by the quenching step can result in cooling gases which flow off the glass sheet during the quenching step entering the furnace.

Cooling gas which enters the furnace is at a significantly lower temperature than the normal operating temperature within the furnace. As a consequence, the furnace may undergo undesirable temperature swings. Also, cooling gas may prematurely cool the glass sheet in the furnace before reaching the quenching station. Premature cooling of the glass can adversely affect its tempered characteristics or shape and is especially a problem with relatively thin glass which requires more quench gases to temper properly than does thicker glass.

U.S. Pat. No. 2,144,320 to Bailey for means for thermally toughening glass discloses headers mounted at an exit end of a glass sheet heating furnace. The headers are disposed above and below a roller conveyor and deliver cooling air directed at an inclination to partitions located adjacent the exit end of the furnace. The partitions are said to deflect some of the cooling air that tends to enter the glass heating furnace as the glass sheet is being quenched.

DISCLOSURE OF INVENTION

An object of the present invention is to provide a blow back control device in a glass sheet tempering system that prevents cooling gas which is applied to quench a heated glass sheet, at a quenching station, from entering an associated glass heating furnace adjacent the quenching station.

In carrying out the above object, the blow back control device is used in a glass tempering system that processes a sheet of glass that has been heated in the glass heating furnace. The furnace includes an exit portion having an exit opening through which the heated glass sheet is discharged from the furnace by a glass sheet conveyor in a direction of glass sheet conveyance. The glass tempering system also includes a quenching station, including blastheads, adjacent the exit portion of the furnace for applying cooling gas to the heated glass sheet.

The blow back control device comprises an air supply member mounted adjacent the exit opening between the glass heating furnace and the quenching station for supplying a planar jet of high pressure air across the exit opening. The planar jet of high pressure air is directed for supplying blow back control air generally in the direction of glass sheet conveyance away from the exit opening of the furnace and toward the quenching station at an angle in the range of between 5° and 25° formed between the planar jet wall of high pressure air and the plane of conveyance of the glass sheet along the conveyor. The jet thereby peels off and deflects cooling air, supplied by the blastheads and travelling along the glass sheet during the tempering, from entering the exit opening of the furnace.

In the preferred embodiment of the invention, the air supply member is a conduit including an outlet for delivering the planar jet of high pressure air. Preferably, the conduit is a tube mounted perpendicular to the direction of glass sheet conveyance. The outlet in the tube is a plurality of apertures extending generally linearly along the tube although the outlet can be a slit extending along the tube.

A compressed air supply supplies blow back control air to the blow back control device. A controller is operable for regulating the compressed air supply to provide maximum air pressure when the glass sheet is exiting the furnace and entering the quench station and subsequently reduces the pressure during the quenching of the heated glass sheet.

Preferably, two tubes are mounted adjacent the exit opening. One tube being mounted above the plane of conveyance of the glass sheet and the other two being mounted below the plane of conveyance. Most preferably, the planar jet of high pressure air jet is directed to strike the plane of conveyance at an angle generally of about 16°.

The objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is an enlarged view of the elevation shown in FIG. 2 illustrating the orientation of the air supply members and the quench station;

FIG. 4 is a perspective view of the air supply members shown in FIGS. 1-3 illustrated as haVing a plurality of apertures extending generally linearly along each air supply member; and FIG. 5 is a perspective view of an alternative embodiment of the air supply member illustrated as including a slit extending along the length of each air supply member.

BEST MODE FOR CARRYING OUT THE INVENTION

Figure 1:
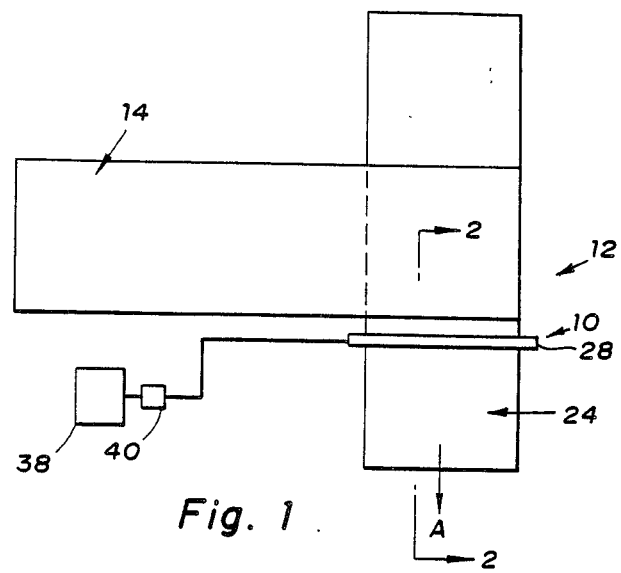
FIG. 1 is a plan view of a glass tempering system including a blow back control device constructed in accordance with the present invention.

Referring to FIG. 1 of the drawings, a blow back control device constructed in accordance with the present invention is generally indicated by reference numeral 10 and is used in a glass tempering system 12. The tempering performed in tempering system 12 includes tempering and heat strengthening where stresses are much less than conventional tempering. As is hereinafter more fully described, the blow back control device 10 prevents cooling gas used for glass quenching from traveling into a glass heating furnace 14. The blow back control device 10 thereby prevents temperature swings in the furnace 14 and premature cooling of glass sheets still in the furnace.

Figure 2:
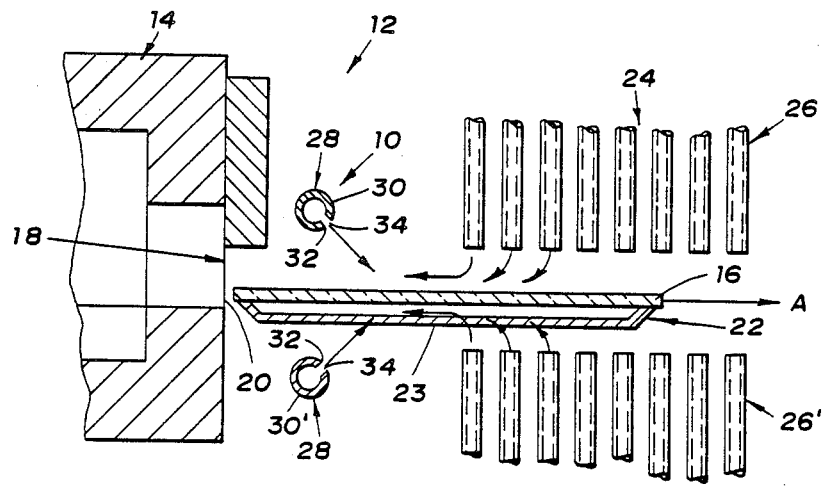
FIG. 2 is an elevational view taken along lines 2—2 in FIG. 1 and illustrating a pair of air supply members mounted between glass sheet heating and quenching stations and mounted one above and one below a plane of glass sheet conveyance.

As shown in FIGS. 1 and 2, the glass tempering system 12 processes a sheet of glass 16 that has been heated in the glass heating furnace 14. The furnace 14 includes an exit portion 18 having an exit opening 20 through which the heated glass sheet 16 is discharged from the furnace by a glass sheet conveyor 22 in a direction of glass sheet conveyance indicated by arrow A. As shown, glass heating furnace 14 is a side exit type furnace which utilizes a quench ring 23 as the conveyor 22 on which the glass sheet 16 is received, supported and conveyed. The blow back control device 10 has also been used with an end exit glass heating furnace 14 which utilizes a roller conveyor for conveying glass sheets 16 out of the exit end of the furnace.

In FIG. 2, the glass tempering system 12 includes a quenching station 24 which includes upper and lower blastheads 26, 26' that are located adjacent the exit portion 18 of the furnace 14 for rapidly applying cooling gas to the heated glass sheet 16 immediately after the glass sheet exits the furnace. Glass sheet 16 exits the glass heating furnace 14 in a direction of glass sheet conveyance illustrated by arrow A. Some of the cooling air supplied by the blastheads 26,26' travels along the quenched glass sheet 16 toward the exit opening 20 of the glass heating furnace 14.

With reference to FIGS. 2 and 3 of the drawings, the blow back control device 10 comprises an air supply member 28 for supplying a planar jet of high pressure air across the exit opening. Air supply member 28 is mounted adjacent the exit opening 20 between the glass heating furnace 14 and the quenching station 24. Member 28 is mounted so that the planar jet of high pressure air is directed for supplying blow back control air generally in the direction of glass sheet conveyance A away from the exit opening 20 of the furnace 14 and toward the quenching station 24 at an angle in the range of 5° and 25° formed between the planar jet of high pressure air and the plane of conveyance A of the glass sheet along the conveyor 22. The air supply member 28 peeled and deflects cooling air, supplied by the blastheads and traveling along the glass sheet 16 during the tempering, from entering the exit opening 20 of the furnace 14 and thereby from prematurely cooling other glass sheets within the furnace.

As seen in FIGS. 4 and 5 of the drawings, the air supply member 28 is a tube 30 including an outlet 32 for delivering the jet of blow back control air. In FIG. 4, outlet 32 is a plurality of apertures 34 extending generally linearly along the tube 30. In an alternative embodiment shown in FIG. 5, outlet 32 is a slit 36 extending along the tube 30.

With further reference to FIG. 1 of the drawings, the tube 30, or air supply member 28, is mounted generally perpendicular to the direction of glass sheet conveyance A. As shown in FIGS. 4 and 5 of the drawings, the tube 30 may be shaped to accommodate the shape of the glass sheet 16 being quenched and thereby to provide a more effective device for deflecting blow back gases traveling along a shaped glass sheet. The blow back control device 10 includes a compressed air supply 38 which is regulated by a control 40 that provides maximum air pressure when the glass sheet 16 is exiting the furnace 14 and entering the quenching station 24 when the greatest chance of cooling air entering the furnace 14 exists. The controller 40 subsequently reduces the pressure during the quenching of the heated glass sheet 16.

As illustrated in FIGS. 2 and 3 of the drawings, two tubes 30,30' are mounted adjacent the exit opening 2 of furnace 14. One tube 30 is mounted above the plane of conveyance of the glass sheet and the other tube 30' is mounted below the plane of conveyance. In the preferred orientation, illustrated in FIG. 3, the planar jet of high pressure air is directed via mounting of the tube 30 to strike the plane of conveyance of the glass sheet at an angle generally of about 16°.

While the best mode for carrying out the invention has been described in detail, those familiar with the art to which this invention relates will recognize various alternative designs and embodiments for practicing the invention as defined by the following claims.

What is claimed is:

1. In a glass tempering system that processes a sheet of glass that has been heated in a glass heating furnace, the furnace including an exit portion having an exit opening through which the heated glass sheet is discharged from the furnace by a glass sheet conveyor in a direction of glass sheet conveyance, the glass tempering system also having a quenching station, including the blastheads, adjacent the exit portion of the furnace for applying cooling gas to the heated glass sheet, a blowback control device comprising: an air supply member for supplying a planar jet of high pressure air across the exit opening; said member being mounted adjacent the exit opening between the glass heating furnace and the quenching station; said planar jet of high-pressure air being directing for supplying block-back control air generally in the direction of glass sheet conveyance away from the exit opening of the furnace and toward the quenching station at an angle in the range of between 0 and 25 degrees formed between the planar jet and a plane of conveyance of the glass sheet along the conveyor to thereby deflect cooling air, supplied by the blastheads and travelling along the glass sheet during the tempering, from entering the exit opening of the furnace.

2. A device as in claim 1 wherein said member is a conduit including an outlet for delivering the planar jet of high pressure air.

3. A device as in claim 2 wherein said conduit is a tube mounted generally perpendicular to the direction of glass sheet conveyance.

4. A device as in claim 3 wherein said outlet is a plurality of apertures extending generally linearly along said tube.

5. A device as in claim 3 wherein said outlet is a slit extending along said tube.

6. A device as in claim 4 or 5 wherein the planar of high pressure air is directed to strike the plane of conveyance at an angle generally of about 16 degrees.

7. A device as in claim 6 further including a compressed air supply.

8. A device as in claim 7 including a controller for regulating said compressed air supply to provide maximum air pressure when the glass sheet is exiting the furnace and entering the quenching station and subsequently reducing the pressure during the quenching of the heated glass sheet.

9. A device as in claim 8 wherein two of said tubes are mounted adjacent the exit opening, one tube being mounted thereabove the plane of conveyance and the other tube being mounted therebelow the plane of conveyance.

10. A device as in claim 6 wherein said glass sheet conveyor is a quench ring on which the glass sheet is received and supported.

11. A device as in claim 6 wherein said glass sheet conveyor is a roller conveyor including rolls for receiving the glass sheet.

12. In a glass tempering system that processes a sheet of glass that has been heated in a glass heating furnace, the furnace including an exit portion having an exit opening through which the heated glass sheet is discharged from the furnace by a glass sheet conveyor in a direction of glass sheet conveyance, the glass tempering system also having a quenching station, including blastheads, adjacent the exit portion of the furnace for applying cooling gas to the heated glass sheet, a blow-back control device comprising: at least two air supply members of a tube shape and having a plurality of apertures extending generally linearly along said tube each for supplying a planar jet of high pressure air across the exit opening; said members being mounted adjacent the exit opening, and generally perpendicular to the direction of glass sheet conveyance, between the glass heating furnace and the quenching station; one of said members being mounted above the plane of conveyance and the other being mounted below the plane of conveyance; said planar jet of high pressure air being directed for supplying blow-back control air generally in the direction of glass sheet conveyance away from the exit opening of the furnace and toward the quenching station at an angle in the range of between 5 and 25 degrees formed between the planar jet of high pressure air and the plane of conveyance of the glass sheet along the conveyor to thereby deflect cooling air, supplied by the blastheads and travelling along the glass sheet during the tempering, from entering the exit opening of the furnace.

13. In a glass tempering system that processes a sheet of glass that has been heated in a glass heating furnace, the furnace including an exit portion having an exit opening through which the heated glass sheet is discharged from the furnace by a glass sheet conveyor in a direction of glass sheet conveyance, the glass tempering system also having a quenching station, including blastheads, adjacent the exit portion of the furnace for applying cooling gas to the heated glass sheet, a blow back control device comprising: at least two air supply members of a tube shape and having a slit extending generally linearly along said tube each for supplying a planar jet of high pressure air across the exit opening; said members being mounted adjacent the exit opening, and generally perpendicular to the direction of glass sheet conveyance, between the glass heating furnace and the quenching station; one of said members being mounted above the plane of conveyance and the other being mounted below the plane of conveyance; said planar jet of high pressure air being directed for supplying blow-back control air generally in the direction of glass sheet conveyance away from the exit opening of the furnace and toward the quenching station at an angle in the range of between 5 and 25 degrees formed between the planar jet of high pressure air and the plane of conveyance of the glass sheet along the conveyor to thereby deflect cooling air, supplied by the blastheads and travelling along the glass sheet during the tempering, from entering the exit opening of the furnace.

* * * * *